US012672159B2

(12) United States Patent
Lei

(10) Patent No.: US 12,672,159 B2
(45) Date of Patent: Jun. 30, 2026

(54) TRANSMISSION METHOD, DEVICE, AND STORAGE MEDIUM USING HOME AND COORDINATION CELL PORTIONS IN SUPER CELL BASED ON RESOURCE SCHEDULING POLICY

(71) Applicant: ZTE CORPORATION, Shenzhen (CN)

(72) Inventor: Chaoqin Lei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 370 days.

(21) Appl. No.: 18/546,657

(22) PCT Filed: Dec. 2, 2021

(86) PCT No.: PCT/CN2021/135105
§ 371 (c)(1),
(2) Date: Aug. 16, 2023

(87) PCT Pub. No.: WO2022/174648
PCT Pub. Date: Aug. 25, 2022

(65) Prior Publication Data
US 2024/0129943 A1      Apr. 18, 2024

(30) Foreign Application Priority Data

Feb. 18, 2021    (CN) .......................... 202110188095.4

(51) Int. Cl.
*H04W 72/50*        (2023.01)
*H04L 5/00*         (2006.01)
(Continued)

(52) U.S. Cl.
CPC ......... *H04W 72/535* (2023.01); *H04L 5/0035* (2013.01); *H04W 28/16* (2013.01); *H04W 76/15* (2018.02)

(58) Field of Classification Search
CPC .. H04L 5/0035; H04W 28/16; H04W 72/535; H04W 72/1273; H04W 76/15
See application file for complete search history.

(56) References Cited

U.S. PATENT DOCUMENTS

2012/0178462 A1    7/2012  Kim
2020/0015229 A1*   1/2020  Yang ..................... H04L 5/0055
(Continued)

FOREIGN PATENT DOCUMENTS

| CN | 101778479 A | 7/2010 |
| CN | 108401258 A | 8/2018 |
| CN | 111988860 A | 11/2020 |

OTHER PUBLICATIONS

European Patent Office. Extended European Search Report for EP Application No. 21926362.1, mailed Oct. 10, 2024, pp. 1-17.
(Continued)

*Primary Examiner* — Pao Sinkantarakorn
(74) *Attorney, Agent, or Firm* — Vivacqua Crane, PLLC

(57) ABSTRACT

Disclosed are a transmission method, device, and storage medium. The transmission method may include: determining a home Cell Portion (CP) and a coordination CP corresponding to a User Equipment (UE) from a plurality of CPs comprised in a super cell; transmitting data of a first Physical Downlink Control Channel (PDCCH) to the UE jointly through the home CP and the coordination CP and transmitting data of different layers of a first Physical Downlink Shared Channel (PDSCH) to the UE through the home CP and the coordination CP, in response to a resource scheduling policy of the super cell being a centralized scheduling policy, wherein the first PDSCH is scheduled by the first PDCCH.

11 Claims, 5 Drawing Sheets

S110

Determine a home CP and a coordination CP corresponding to a UE from a plurality of CPs included in a super cell

S120A

Transmit data of a first PDCCH to the UE jointly through the home CP and the coordination CP and transmit data of different layers of a first PDSCH to the UE through the home CP and the coordination CP when a resource scheduling policy of the super cell is a centralized scheduling policy, where the first PDSCH is scheduled by the first PDCCH

S120B

Transmit data of a second PDCCH through the home CP and data of a third PDCCH through the coordination CP to the UE and transmit data of a second PDSCH through the home CP and data of a third PDSCH through the coordination CP to the UE when the resource scheduling policy of the super cell is a distributed scheduling policy, where the second PDSCH is scheduled by the second PDCCH, and the third PDSCH is scheduled by the third PDCCH

(51) Int. Cl.
*H04W 28/16* (2009.01)
*H04W 76/15* (2018.01)

(56) References Cited

U.S. PATENT DOCUMENTS

| | | | | |
|---|---|---|---|---|
| 2020/0196230 A1* | 6/2020 | John Wilson | .......... | H04B 7/024 |
| 2020/0358557 A1* | 11/2020 | Park | .................... | H03M 13/618 |
| 2021/0058113 A1* | 2/2021 | Jung | ...................... | H04B 7/088 |
| 2023/0224726 A1* | 7/2023 | Kim | ...................... | H04B 7/024 |
| | | | | 370/329 |

OTHER PUBLICATIONS

3GPP Technical Specification Group Radio Access Network. "Enhancements on multi-TRP/panel transmission," 3GPP TSG RAN WG1 NR Meeting #94bis, Oct. 2018, pp. 1-17.

3GPP Technical Specification Group Radio Access Network. "NR UE Power Saving Designs," 3GPP TSG RAN WG1 NR Meeting #96, 2019, pp. 1-28.

3GPP Technical Specification Group Radio Access Network. "On adaptation aspects for NR UE power consumption reduction," 3GPP TSG RAN WG1 Ad-Hoc Meeting 1901, Jan. 2019, pp. 1-13.

European Patent Office. Partial Supplementary European Search Report for EP Application No. 21926362.1, mailed Jul. 19, 2024, pp. 1-19.

Karimi, A., et al. "5G Centralized Multi-Cell Scheduling for URLLC: Algorithms and System-Level Performance," IEEE Access, vol. 6, 2018, pp. 72253-72262.

3GPP Technical Specification Group Radio Access Network. "Aspects of Coordinated Multi-point Transmission for Advanced E-UTRA," 3GPP TSG-RAN WG1 Meeting #55, Nov. 2008, pp. 1-5.

International Searching Authority. International Search Report and Written Opinion for PCT Application No. PCT/CN2021/135105 and English translation, mailed Feb. 17, 2022, pp. 1-11.

* cited by examiner

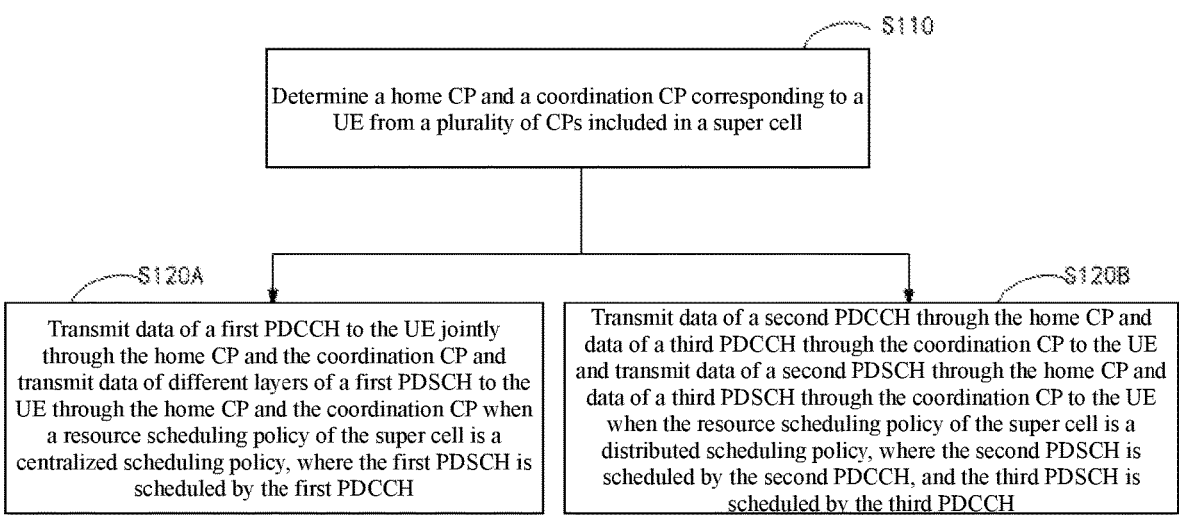

S110

Determine a home CP and a coordination CP corresponding to a UE from a plurality of CPs included in a super cell

S120A

Transmit data of a first PDCCH to the UE jointly through the home CP and the coordination CP and transmit data of different layers of a first PDSCH to the UE through the home CP and the coordination CP when a resource scheduling policy of the super cell is a centralized scheduling policy, where the first PDSCH is scheduled by the first PDCCH

S120B

Transmit data of a second PDCCH through the home CP and data of a third PDCCH through the coordination CP to the UE and transmit data of a second PDSCH through the home CP and data of a third PDSCH through the coordination CP to the UE when the resource scheduling policy of the super cell is a distributed scheduling policy, where the second PDSCH is scheduled by the second PDCCH, and the third PDSCH is scheduled by the third PDCCH

FIG. 1

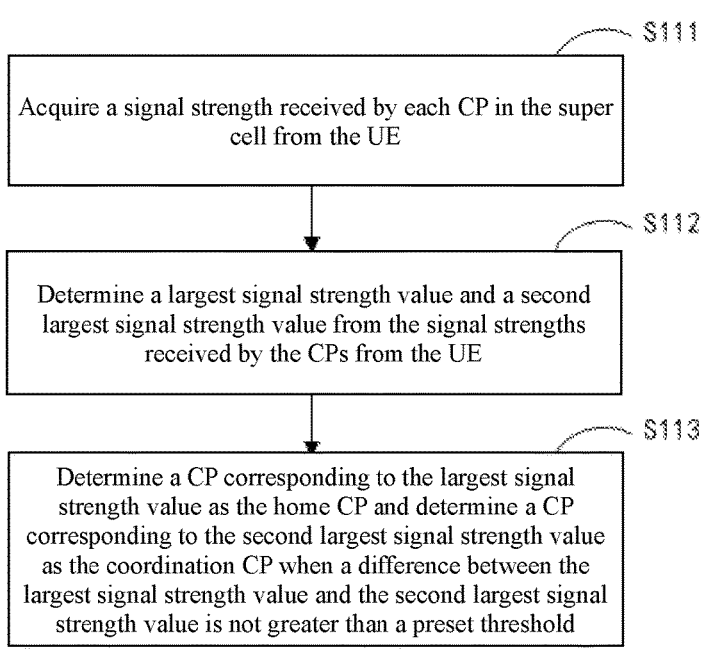

S111

Acquire a signal strength received by each CP in the super cell from the UE

S112

Determine a largest signal strength value and a second largest signal strength value from the signal strengths received by the CPs from the UE

S113

Determine a CP corresponding to the largest signal strength value as the home CP and determine a CP corresponding to the second largest signal strength value as the coordination CP when a difference between the largest signal strength value and the second largest signal strength value is not greater than a preset threshold

Figures 3A, 3B:
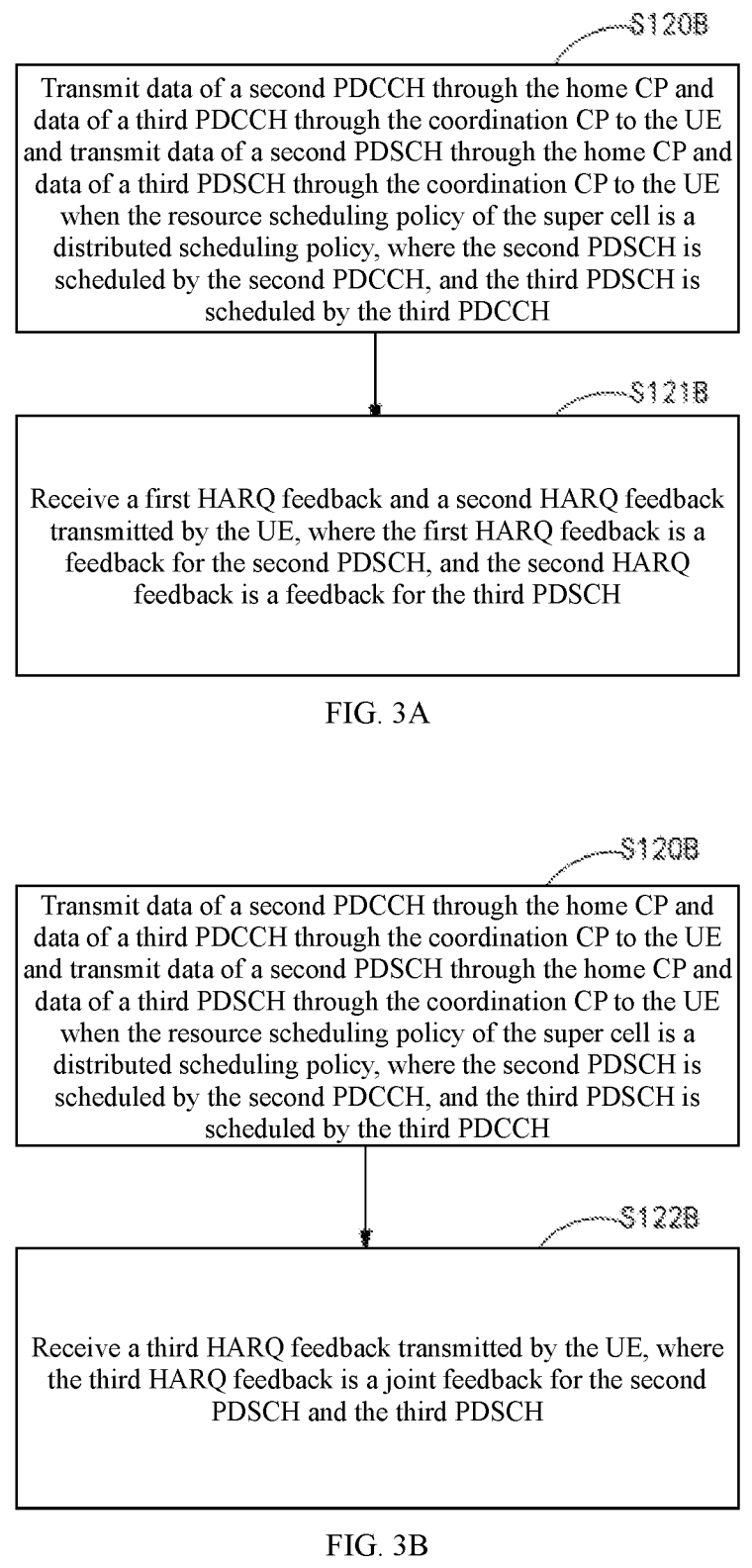

Transmit data of a second PDCCH through the home CP and data of a third PDCCH through the coordination CP to the UE and transmit data of a second PDSCH through the home CP and data of a third PDSCH through the coordination CP to the UE when the resource scheduling policy of the super cell is a distributed scheduling policy, where the second PDSCH is scheduled by the second PDCCH, and the third PDSCH is scheduled by the third PDCCH

S121B

Receive a first HARQ feedback and a second HARQ feedback transmitted by the UE, where the first HARQ feedback is a feedback for the second PDSCH, and the second HARQ feedback is a feedback for the third PDSCH

Transmit data of a second PDCCH through the home CP and data of a third PDCCH through the coordination CP to the UE and transmit data of a second PDSCH through the home CP and data of a third PDSCH through the coordination CP to the UE when the resource scheduling policy of the super cell is a distributed scheduling policy, where the second PDSCH is scheduled by the second PDCCH, and the third PDSCH is scheduled by the third PDCCH

S122B

Receive a third HARQ feedback transmitted by the UE, where the third HARQ feedback is a joint feedback for the second PDSCH and the third PDSCH

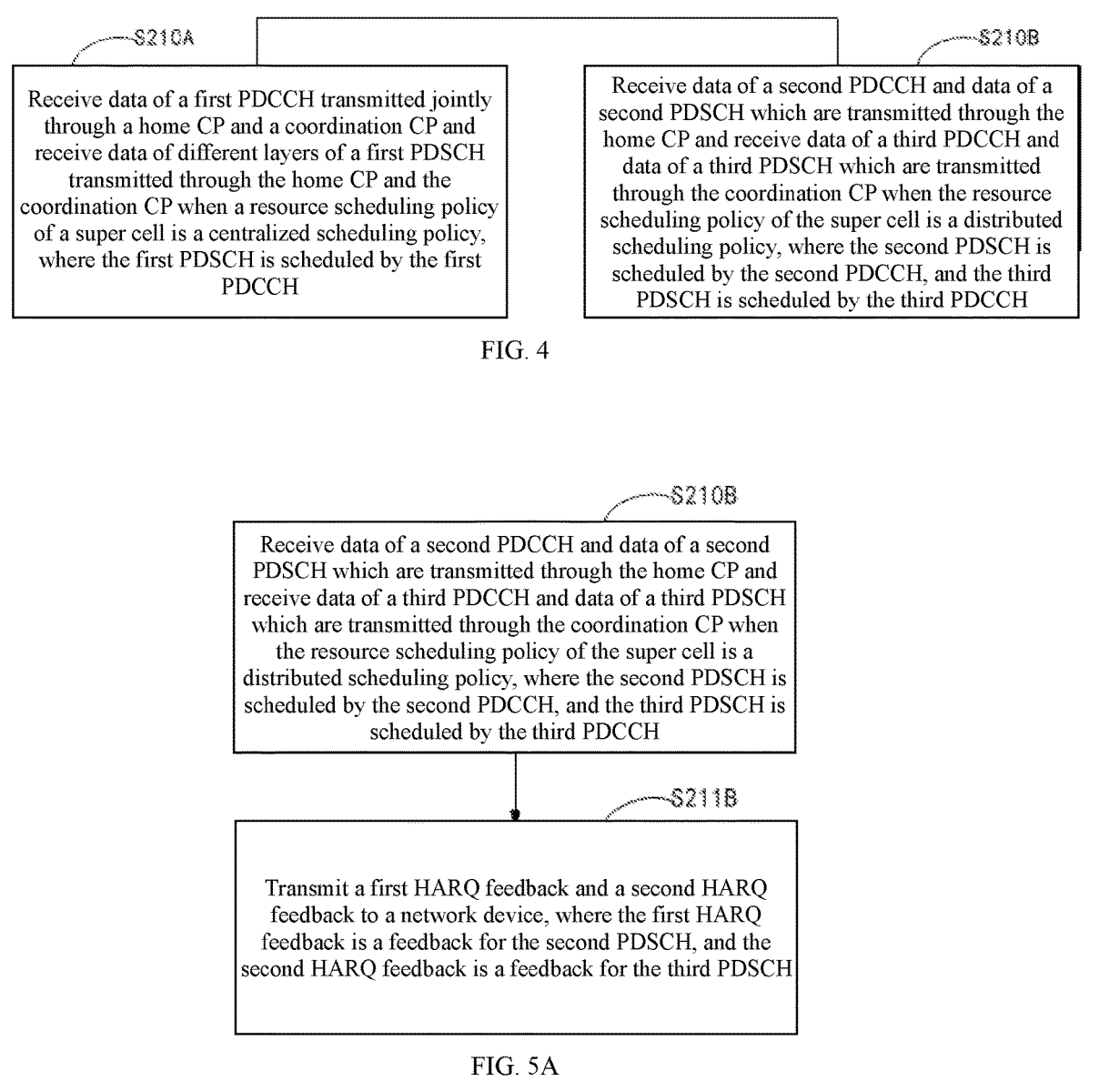

Receive data of a first PDCCH transmitted jointly through a home CP and a coordination CP and receive data of different layers of a first PDSCH transmitted through the home CP and the coordination CP when a resource scheduling policy of a super cell is a centralized scheduling policy, where the first PDSCH is scheduled by the first PDCCH

S210B

Receive data of a second PDCCH and data of a second PDSCH which are transmitted through the home CP and receive data of a third PDCCH and data of a third PDSCH which are transmitted through the coordination CP when the resource scheduling policy of the super cell is a distributed scheduling policy, where the second PDSCH is scheduled by the second PDCCH, and the third PDSCH is scheduled by the third PDCCH

Receive data of a second PDCCH and data of a second PDSCH which are transmitted through the home CP and receive data of a third PDCCH and data of a third PDSCH which are transmitted through the coordination CP when the resource scheduling policy of the super cell is a distributed scheduling policy, where the second PDSCH is scheduled by the second PDCCH, and the third PDSCH is scheduled by the third PDCCH

S211B

Transmit a first HARQ feedback and a second HARQ feedback to a network device, where the first HARQ feedback is a feedback for the second PDSCH, and the second HARQ feedback is a feedback for the third PDSCH

FIG. 5A

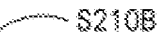

Receive data of a second PDCCH and data of a second PDSCH which are transmitted through the home CP and receive data of a third PDCCH and data of a third PDSCH which are transmitted through the coordination CP when the resource scheduling policy of the super cell is a distributed scheduling policy, where the second PDSCH is scheduled by the second PDCCH, and the third PDSCH is scheduled by the third PDCCH

S212B

Transmit a third HARQ feedback to a network device, where the third HARQ feedback is a joint feedback for the second PDSCH and the third PDSCH

FIG. 5B

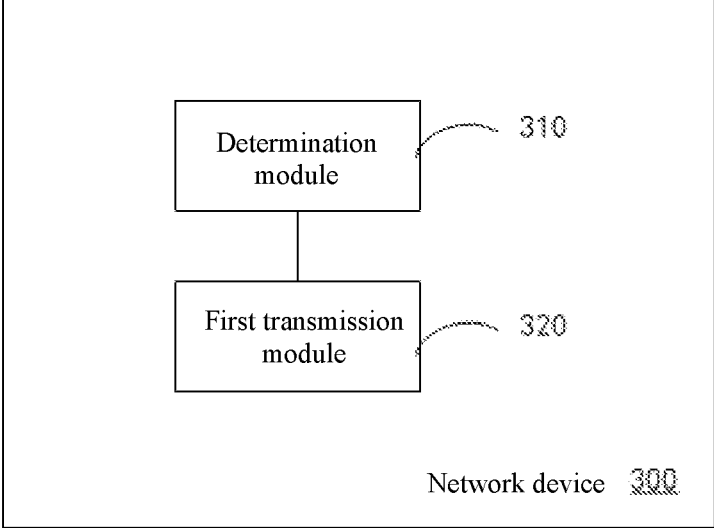

FIG. 6

TRANSMISSION METHOD, DEVICE, AND STORAGE MEDIUM USING HOME AND COORDINATION CELL PORTIONS IN SUPER CELL BASED ON RESOURCE SCHEDULING POLICY

CROSS-REFERENCE TO RELATED APPLICATION

This application is a national stage filing under 35 U.S.C. § 371 of international application number PCT/CN2021/135105, filed Dec. 2, 2021, which claims priority to Chinese patent application No. 202110188095.4, filed Feb. 18, 2021. The contents of these applications are incorporated herein by reference in their entirety.

TECHNICAL FIELD

The present disclosure relates to the technical field of communication, and more particularly, to a transmission method, device, and storage medium.

BACKGROUND

The 3GPP put forward a Multi Transmission/Reception Point (multi-TRP) transmission mode in 5G Release 16, which is suitable for the enhancement of mobile broadband services.

A super cell includes a plurality of Cell Portions (CPs). Each CP shares resources in the super cell, including Physical-Layer Cell Identities (PCIs), time domain resources, frequency domain resources, and the like. The number of users in the super cell is the sum of the numbers of users in the plurality of CPs. There is no clear scheme on how to realize multi-TRP transmission for User Equipments (UEs) in the super cell at present.

SUMMARY

The following is a summary of the subject matter set forth in the description. This summary is not intended to limit the scope of protection of the claims.

Embodiments of the present disclosure provide a transmission method, device, and storage medium.

In accordance with a first aspect of the present disclosure, an embodiment provides a transmission method, which is applied to a network device side. The method includes: determining a home Cell Portion (CP) and a coordination CP corresponding to a User Equipment (UE) from a plurality of CPs included in a super cell; transmitting data of a first Physical Downlink Control Channel (PDCCH) to the UE jointly through the home CP and the coordination CP and transmitting data of different layers of a first Physical Downlink Shared Channel (PDSCH) to the UE through the home CP and the coordination CP, in response to a resource scheduling policy of the super cell being a centralized scheduling policy, where the first PDSCH is scheduled by the first PDCCH; or transmitting data of a second PDCCH through the home CP and data of a third PDCCH through the coordination CP to the UE and transmitting data of a second PDSCH through the home CP and data of a third PDSCH through the coordination CP to the UE, in response to the resource scheduling policy of the super cell being a distributed scheduling policy, where the second PDSCH is scheduled by the second PDCCH, and the third PDSCH is scheduled by the third PDCCH.

In accordance with a second aspect of the present disclosure, an embodiment provides a transmission method, which is applied to a UE side. The method includes: receiving data of a first PDCCH transmitted jointly through a home CP and a coordination CP and receiving data of different layers of a first PDSCH transmitted through the home CP and the coordination CP, in response to a resource scheduling policy of a super cell being a centralized scheduling policy, where the first PDSCH is scheduled by the first PDCCH; or receiving data of a second PDCCH and data of a second PDSCH which are transmitted through the home CP and receiving data of a third PDCCH and data of a third PDSCH which are transmitted through the coordination CP, in response to the resource scheduling policy of the super cell being a distributed scheduling policy, where the second PDSCH is scheduled by the second PDCCH, and the third PDSCH is scheduled by the third PDCCH.

In accordance with a third aspect of the present disclosure, an embodiment further provides a network device. The device includes: a determination module, configured for determining a home CP and a coordination CP corresponding to a UE from a plurality of CPs included in a super cell; and a first transmission module, configured for transmitting data of a first PDCCH to the UE jointly through the home CP and the coordination CP and transmitting data of different layers of a first PDSCH to the UE through the home CP and the coordination CP, in response to a resource scheduling policy of the super cell being a centralized scheduling policy, where the first PDSCH is scheduled by the first PDCCH; or transmitting data of a second PDCCH through the home CP and data of a third PDCCH through the coordination CP to the UE and transmitting data of a second PDSCH through the home CP and data of a third PDSCH through the coordination CP to the UE, in response to the resource scheduling policy of the super cell being a distributed scheduling policy, where the second PDSCH is scheduled by the second PDCCH, and the third PDSCH is scheduled by the third PDCCH.

In accordance with a fourth aspect of the present disclosure, an embodiment further provides a UE. The UE includes: a second transmission module, configured for: receiving data of a first PDCCH transmitted jointly through a home CP and a coordination CP and receiving data of different layers of a first PDSCH transmitted through the home CP and the coordination CP, in response to a resource scheduling policy of a super cell being a centralized scheduling policy, where the first PDSCH is scheduled by the first PDCCH; or receiving data of a second PDCCH and data of a second PDSCH which are transmitted through the home CP and receiving data of a third PDCCH and data of a third PDSCH which are transmitted through the coordination CP, in response to the resource scheduling policy of the super cell being a distributed scheduling policy, where the second PDSCH is scheduled by the second PDCCH, and the third PDSCH is scheduled by the third PDCCH.

In accordance with a fifth aspect of the present disclosure, an embodiment provides an electronic device. The device includes: a memory, a processor, and a computer program stored in the memory and executable by the processor which, when executed by the processor, causes the processor to implement the transmission method in accordance with the first aspect or the second aspect of the present disclosure.

In accordance with a sixth aspect of the present disclosure, an embodiment further provides a computer-readable storage medium, storing a computer program which, when executed by a processor, causes the processor to implement the transmission method in accordance with the first aspect or the second aspect of the present disclosure.

Additional features and advantages of the disclosure will be set forth in the description which follows, and in part will be obvious from the description, or may be learned by the practice of the disclosure. The objects and other advantages of the present disclosure can be realized and obtained by the structures particularly pointed out in the description, claims, and accompanying drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure.

FIG. 1 is a flowchart of a transmission method according to an embodiment of the present disclosure;

FIG. 2 is a flowchart showing operations of S110 in FIG. 1;

FIG. 3A is a flowchart of another transmission method according to an embodiment of the present disclosure;

FIG. 3B is a flowchart of another transmission method according to an embodiment of the present disclosure;

FIG. 4 is a flowchart of another transmission method according to an embodiment of the present disclosure;

FIG. 5A is a flowchart of another transmission method according to an embodiment of the present disclosure;

FIG. 5B is a flowchart of another transmission method according to an embodiment of the present disclosure;

FIG. 6 is a schematic structural diagram of a network device according to an embodiment of the present disclosure.

DETAILED DESCRIPTION

Figure 7:
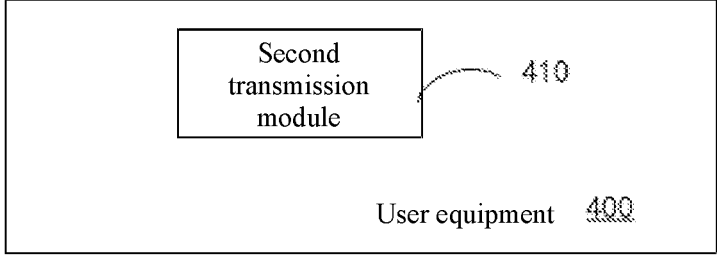
FIG. 7 is a schematic structural diagram of a user equipment according to an embodiment of the present disclosure.

To make the objects, technical schemes, and advantages of the present disclosure clear, the present disclosure is described in further detail in conjunction with accompanying drawings and examples. It should be understood that the specific embodiments described herein are merely used for illustrating the present disclosure, and are not intended to limit the present disclosure.

It should be understood that in the description of the embodiments of the present disclosure, the terms such as "first", "second" and the like used herein are merely used for distinguishing technical features, and are not intended to indicate or imply relative importance, or implicitly point out the number of the indicated technical features, or implicitly point out a precedence order of the indicated technical features. The term "at least one" means one or more, and the term "a plurality of" means two or more. The term "and/or" is used for describing an association between associated objects and representing that three associations may exist. For example, "A and/or B" may indicate that only A exists, only B exists, and both A and B exist, where A and B may be singular or plural. The character "/" generally indicates an "or" relation between the associated objects. "At least one of" and similar expressions refer to any combination of items listed, including one item or any combination of a plurality of items. For example, at least one of a, b, or c may represent a, b, c, "a and b", "a and c", "b and c", or "a, b, and c", where a, b, and c may be singular or plural.

In addition, the technical features involved in various embodiments of the present disclosure described below can be combined with each other if not in confliction.

FIG. 1 shows a transmission method according to an embodiment of the present disclosure. In an embodiment of the present disclosure, the transmission method shown in FIG. 1 is executed by a network device side. In the present disclosure, a network device refers to a device on a base station side, e.g., a scheduling system device (centralized scheduler and/or other similar devices) associated with a super cell.

As shown in FIG. 1, the transmission method provided in the embodiment of the present disclosure includes the following steps S110 to S120B.

At S110, a home Cell Portion (CP) and a coordination CP corresponding to a User Equipment (UE) are determined from a plurality of CPs included in a super cell.

It should be understood that the 3GPP put forward a Multi Transmission/Reception Point (multi-TRP) transmission mode in 5G Release 16, which is suitable for the enhancement of mobile broadband services. The CP described in the embodiments of the present disclosure may also be understood as a TRP. By determining the home CP and the coordination CP corresponding to the UE from the plurality of CPs included in the super cell, multi-TRP coordinative transmission for the UE can be realized through the home CP and the coordination CP.

Referring to FIG. 2, determining a home CP and a coordination CP corresponding to a UE from a plurality of CPs included in a super cell may include the following operations S111 to S113.

At S111, a signal strength received by each CP in the super cell from the UE is acquired.

At S112, a largest signal strength value and a second largest signal strength value are determined from the signal strengths received by the CPs from the UE.

At S113, a CP corresponding to the largest signal strength value is determined as the home CP and a CP corresponding to the second largest signal strength value is determined as the coordination CP when a difference between the largest signal strength value and the second largest signal strength value is not greater than a preset threshold.

In an implementation, each CP in the super cell may acquire the signal strength received by the CP from the UE, and report related signal strength data to a centralized scheduler of the super cell. According to the received signal strength data from the plurality of CPs, the centralized scheduler determines the largest value and the second largest value of the signal strengths received by the plurality of CPs from the UE, and obtains a difference between the largest value and the second largest value; and when the difference between the largest value and the second largest value is not greater than the preset threshold, determine a CP corresponding to the largest value as the home CP and a CP corresponding to the second largest value as the coordination CP. In other words, in the super cell, the CP receiving the largest signal strength from the UE is determined as the home CP of the UE, and the CP receiving the second largest signal strength from the UE is determined as the coordination CP. The difference between the signal strengths received by the home CP and the coordination CP from the UE may need to be not greater than the preset threshold.

It should be understood that when a difference between a signal strength received by a CP from the UE and the signal strength received by the home CP from the UE is not greater than the preset threshold, it means that the UE is located in an overlapping area of the two CPs. Therefore, the CP receiving the second largest signal strength from the UE can be used as the coordination CP to realize multi-point coordinative transmission for the UE together with the home CP, to improve the data transmission throughput for the UE. The value of the preset threshold may be determined according to a cell signal power in an actual application scenario, and may be, for example, set to 6 dB. The value of the preset threshold is not limited in the embodiments of the present disclosure.

At S120A, data of a first Physical Downlink Control Channel (PDCCH) is transmitted to the UE jointly through the home CP and the coordination CP and data of different layers of a first Physical Downlink Shared Channel (PDSCH) is transmitted to the UE through the home CP and the coordination CP when a resource scheduling policy of the super cell is a centralized scheduling policy, where the first PDSCH is scheduled by the first PDCCH.

At S120B, data of a second PDCCH and data of a third PDCCH are transmitted to the UE through the home CP and the coordination CP respectively and data of a second PDSCH and data of a third PDSCH are transmitted to the UE through the home CP and the coordination CP respectively when the resource scheduling policy of the super cell is a distributed scheduling policy, where the second PDSCH is scheduled by the second PDCCH, and the third PDSCH is scheduled by the third PDCCH.

It should be understood that in downlink transmission of a communication system, a network side device generally schedules a PDSCH for a UE based on Downlink Control Information (DCI) transmitted in a PDCCH. The UE can receive downlink data through the PDSCH scheduled by the network side device.

It should be understood that resource scheduling policies of the super cell include the centralized scheduling policy and the distributed scheduling policy. Centralized scheduling means that the super cell centrally allocates time-frequency resources to the UE, and PDCCH data and PDSCH data for the UE are jointly transmitted through a plurality of CPs in the super cell that are activated by the UE. The plurality of CPs activated include CPs that receive a signal strength meeting a threshold from the UE. A plurality of CPs may be activated for one UE. The CP that receives the largest signal strength from the UE is defined as the home CP of the UE. Distributed scheduling means that each CP in the super cell can independently allocate time-frequency resources to the UE, and PDCCH data and PDSCH data of the UE are transmitted through the home CP of the UE in the super cell.

In an embodiment of the present disclosure, when the resource scheduling policy of the super cell is the centralized scheduling policy, the home CP and the coordination CP jointly transmit the first PDCCH to the UE, to realize multi-TRP transmission using a single PDCCH. To be specific, the home CP and the coordination CP simultaneously transmit the same PDCCH to the UE, where the PDCCH transmitted by the home CP and the PDCCH transmitted by the coordination CP have the same parameters and content. For the UE, only a single enhanced PDCCH (i.e., the first PDCCH) is sensed, thereby realizing the transmitting of the single PDCCH to the UE jointly by multiple TRPs.

It should be understood that the first PDSCH scheduled by the first PDCCH has data of a plurality of layers, and the data of each layer of the first PDSCH is correspondingly transmitted by the home CP or the coordination CP. In this way, the data of different layers of the PDSCH scheduled by the single PDCCH is transmitted to the UE jointly through the home CP and the coordination CP. Thus, the UE can obtain a gain of increased throughput through the multi-point coordinative transmission of multiple CPs.

In an embodiment of the present disclosure, when the resource scheduling policy of the super cell is the distributed scheduling policy, the second PDCCH is transmitted to the UE through the home CP, and the third PDCCH is transmitted to the UE through the coordination CP, to realize multi-TRP transmission using a plurality of PDCCHs.

It should be understood that the second PDCCH and the third PDCCH are different PDCCHs for correspondingly scheduling the second PDSCH and the third PDSCH. The second PDSCH is correspondingly transmitted to the UE through the home CP corresponding to the second PDCCH, and the third PDSCH is correspondingly transmitted to the UE through the coordination CP corresponding to the third PDCCH. Thus, the UE can obtain a gain of increased throughput through the multi-point coordinative transmission of multiple CPs.

In an embodiment of the present disclosure, it is determined according to the scheduling policy used by the super cell whether a single PDCCH or a plurality of PDCCHs are used for the coordinative scheduling of the UE in the overlapping area of the CPs, so that an effective coordination mode can be adopted regardless of centralized scheduling or distributed scheduling, thereby increasing the throughput of the UE in the overlapping area of the CPs and the network throughput.

Referring to FIG. 3A, in a possible implementation, after transmitting data of a second PDSCH through the home CP and data of a third PDSCH through the coordination CP to the UE when the resource scheduling policy of the super cell is a distributed scheduling policy, the transmission method of the embodiment of the present disclosure further includes a following operation S121B.

At S121B, a first Hybrid Automatic Repeat Quest (HARQ) feedback and a second HARQ feedback transmitted by the UE are received, where the first HARQ feedback is a feedback for the second PDSCH, and the second HARQ feedback is a feedback for the third PDSCH.

It can be understood that in an embodiment of the present disclosure, when the super cell uses the distributed scheduling policy, the UE respectively transmits HARQ feedbacks for downlink data of the second PDSCH and downlink data of the third PDSCH after receiving the PDSCHs transmitted by the network side device.

Referring to FIG. 3B, in another possible implementation, when the resource scheduling policy of the super cell is the distributed scheduling policy, after transmitting data of a second PDSCH through the home CP and data of a third PDSCH through the coordination CP to the UE, the transmission method of the embodiment of the present disclosure further includes a following operation S122B.

At S122B, a third HARQ feedback transmitted by the UE is received, where the third HARQ feedback is a joint feedback for the second PDSCH and the third PDSCH.

It can be understood that in an embodiment of the present disclosure, when the super cell uses the distributed scheduling policy, the UE transmits a joint HARQ feedback for downlink data of the second PDSCH and downlink data of the third PDSCH after receiving the PDSCHs transmitted by the network side device.

FIG. 4 shows a transmission method according to an embodiment of the present disclosure. The method shown in FIG. 4 is applied to a UE side. The method of the embodiment of the present disclosure includes the following steps S210A to S210B.

At S210A, data of a first PDCCH transmitted jointly through a home CP and a coordination CP is received and data of different layers of a first PDSCH transmitted through the home CP and the coordination CP is received when a resource scheduling policy of a super cell is a centralized scheduling policy, where the first PDSCH is scheduled by the first PDCCH.

At S210B, data of a second PDCCH and data of a second PDSCH which are transmitted through the home CP are received and data of a third PDCCH and data of a third PDSCH which are transmitted through the coordination CP are received when the resource scheduling policy of the super cell is a distributed scheduling policy, where the second PDSCH is scheduled by the second PDCCH, and the third PDSCH is scheduled by the third PDCCH.

It can be understood that in the embodiments of the present disclosure, the home CP is a CP receiving a largest signal strength from the UE among a plurality of CPs included in the super cell; the coordination CP is a CP receiving a second largest signal strength from the UE among the plurality of CPs included in the super cell; and a difference between the signal strengths received by the home CP and the coordination CP from the UE is not greater than a preset threshold.

It should be understood that when a difference between a signal strength received by a CP from the UE and the signal strength received by the home CP from the UE is not greater than the preset threshold, it means that the UE is located in an overlapping area of the two CPs. Therefore, the CP receiving the second largest signal strength from the UE can be used as the coordination CP to realize multi-point coordinative transmission for the UE together with the home CP, to improve the data transmission throughput for the UE.

In the embodiments of the present disclosure, resource scheduling policies of the super cell include the centralized scheduling policy and the distributed scheduling policy. Centralized scheduling means that the super cell centrally allocates time-frequency resources to the UE, and PDCCH data and PDSCH data for the UE are jointly transmitted through a plurality of CPs in the super cell that are activated by the UE. The plurality of CPs activated include CPs that receive a signal strength meeting a threshold from the UE. A plurality of CPs may be activated for one UE. The CP that receives the largest signal strength from the UE is defined as the home CP of the UE. Distributed scheduling means that each CP in the super cell can independently allocate time-frequency resources to the UE, and PDCCH data and PDSCH data of the UE are transmitted through the home CP of the UE in the super cell.

In an embodiment of the present disclosure, when the resource scheduling policy of the super cell is the centralized scheduling policy, the home CP and the coordination CP jointly transmit the first PDCCH to the UE, to realize multi-TRP transmission using a single PDCCH. To be specific, the home CP and the coordination CP simultaneously transmit the same PDCCH to the UE, where the PDCCH transmitted by the home CP and the PDCCH transmitted by the coordination CP have the same parameters and content. For the UE, only a single enhanced PDCCH (i.e., the first PDCCH) is sensed, thereby realizing the receiving, by the UE, of the single PDCCH jointly transmitted by multiple TRPs.

It should be understood that the first PDSCH scheduled by the first PDCCH has data of a plurality of layers, and the data of each layer of the first PDSCH is correspondingly transmitted by the home CP or the coordination CP. In this way, the data of different layers of the PDSCH scheduled by the single PDCCH is transmitted to the UE jointly through the home CP and the coordination CP. Thus, the UE can obtain a gain of increased throughput through the multi-point coordinative transmission of multiple CPs.

In an embodiment of the present disclosure, when the resource scheduling policy of the super cell is the distributed scheduling policy, the second PDCCH is transmitted to the UE through the home CP, and the third PDCCH is transmitted to the UE through the coordination CP, to realize multi-TRP transmission using a plurality of PDCCHs.

It should be understood that the second PDCCH and the third PDCCH are different PDCCHs for correspondingly scheduling the second PDSCH and the third PDSCH. The second PDSCH is correspondingly transmitted to the UE through the home CP corresponding to the second PDCCH, and the third PDSCH is correspondingly transmitted to the UE through the coordination CP corresponding to the third PDCCH. Thus, the UE can obtain a gain of increased throughput through the multi-point coordinative transmission of multiple CPs.

In an embodiment of the present disclosure, it is determined according to the scheduling policy used by the super cell whether a single PDCCH or a plurality of PDCCHs are used for the coordinative scheduling of the UE in the overlapping area of the CPs, so that an effective coordination mode can be adopted regardless of centralized scheduling or distributed scheduling, thereby increasing the throughput of the UE in the overlapping area of the CPs and the network throughput.

Referring to FIG. 5A, in a possible implementation, when the resource scheduling policy of the super cell is the distributed scheduling policy, the transmission method of the embodiment of the present disclosure may further include a following step S211B.

At S211B, a first HARQ feedback and a second HARQ feedback are respectively transmitted to a network device, where the first HARQ feedback is a feedback for the second PDSCH, and the second HARQ feedback is a feedback for the third PDSCH.

It can be understood that in an embodiment of the present disclosure, when the super cell uses the distributed scheduling policy, the UE respectively transmits HARQ feedbacks for downlink data of the second PDSCH and downlink data of the third PDSCH after receiving the PDSCHs transmitted by the network side device.

Referring to FIG. 5B, in another possible implementation, when the resource scheduling policy of the super cell is the distributed scheduling policy, the transmission method of the embodiment of the present disclosure may further include a following step S212B.

At S212B, a third HARQ feedback is transmitted to the network device, where the third HARQ feedback is a joint feedback for the second PDSCH and the third PDSCH.

It can be understood that in an embodiment of the present disclosure, when the super cell uses the distributed scheduling policy, the UE transmits a joint HARQ feedback for downlink data of the second PDSCH and downlink data of the third PDSCH after receiving the PDSCHs transmitted by the network side device.

Referring to FIG. 6, an embodiment of the present disclosure further provides a network device 300, including: a determination module 310, and a first transmission module 320.

The determination module 310 is configured for determining a home CP and a coordination CP corresponding to a UE from a plurality of CPs included in a super cell.

The first transmission module 320 is configured for transmitting data of a first PDCCH to the UE jointly through the home CP and the coordination CP and transmitting data of different layers of a first PDSCH to the UE through the home CP and the coordination CP when a resource scheduling policy of the super cell is a centralized scheduling policy, where the first PDSCH is scheduled by the first PDCCH.

The first transmission module 320 is further configured for transmitting data of a second PDCCH through the home CP and data of a third PDCCH through the coordination CP to the UE and transmitting data of a second PDSCH through the home CP and data of a third PDSCH through the coordination CP to the UE when the resource scheduling policy of the super cell is a distributed scheduling policy, where the second PDSCH is scheduled by the second PDCCH, and the third PDSCH is scheduled by the third PDCCH.

In an embodiment of the present disclosure, the determination module 310 may include: an acquisition unit, a first determination unit and a second determination unit.

The acquisition unit is configured for acquiring a signal strength received by each CP in the super cell from the UE.

The first determination unit is configured for determining a largest signal strength value and a second largest signal strength value from the signal strengths received by the CPs from the UE.

The second determination unit is configured for determining a CP corresponding to the largest signal strength value as the home CP and a CP corresponding to the second largest signal strength value as the coordination CP when a difference between the largest signal strength value and the second largest signal strength value is not greater than a preset threshold.

In an embodiment of the present disclosure, the first transmission module 320 may be further configured for:

receiving a first HARQ feedback and a second HARQ feedback transmitted by the UE, where the first HARQ feedback is a feedback for the second PDSCH, and the second HARQ feedback is a feedback for the third PDSCH;

or receiving a third HARQ feedback transmitted by the UE, where the third HARQ feedback is a joint feedback for the second PDSCH and the third PDSCH.

Referring to FIG. 7, an embodiment of the present disclosure further provides a UE 400, including a second transmission module 410.

The second transmission module 410 is configured for receiving data of a first PDCCH transmitted jointly through a home CP and a coordination CP and receiving data of different layers of a first PDSCH transmitted through the home CP and the coordination CP when a resource scheduling policy of a super cell is a centralized scheduling policy, where the first PDSCH is scheduled by the first PDCCH.

The second transmission module 410 is further configured for receiving data of a second PDCCH and data of a second PDSCH which are transmitted through the home CP and receiving data of a third PDCCH and data of a third PDSCH which are transmitted through the coordination CP when the resource scheduling policy of the super cell is a distributed scheduling policy, where the second PDSCH is scheduled by the second PDCCH, and the third PDSCH is scheduled by the third PDCCH.

In an embodiment of the present disclosure, the second transmission module 410 is further configured for:

respectively transmitting a first HARQ feedback and a second HARQ feedback to a network device, where the first HARQ feedback is a feedback for the second PDSCH, and the second HARQ feedback is a feedback for the third PDSCH;

or transmitting a third HARQ feedback to the network device, where the third HARQ feedback is a joint feedback for the second PDSCH and the third PDSCH.

It should be noted that the information exchange and execution processes between the above modules are based on the same concept as the method embodiments of the present disclosure. For specific functions and technical effects of the modules, reference may be made to the descriptions in the method embodiments, and the details will not be repeated herein.

In the above embodiments, the description in each embodiment has its own focus. For parts that are not detailed or set forth in an embodiment, reference may be made to the relevant descriptions in other embodiments.

Figure 8:
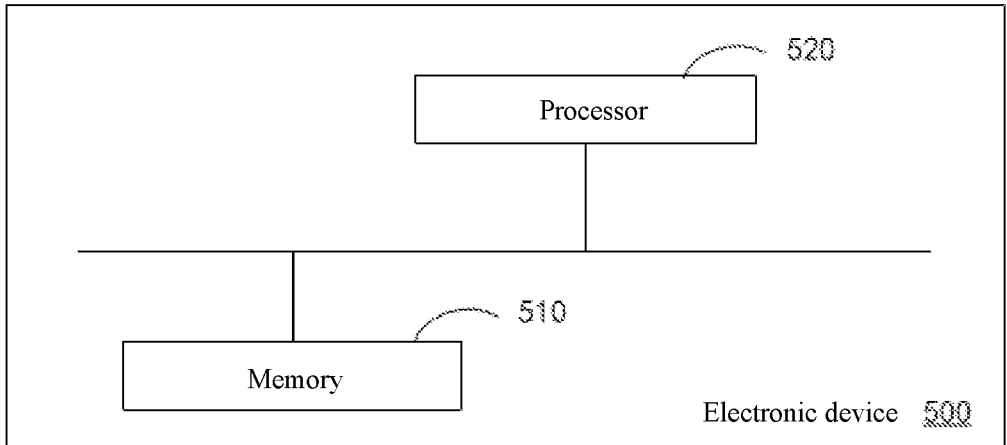
FIG. 8 is a schematic structural diagram of an electronic device according to an embodiment of the present disclosure.

FIG. 8 shows a network device 500 according to an embodiment of the present disclosure. The device includes a memory 510, a processor 520, and a computer program stored in the memory 510 and executable by the processor 520.

The processor 520 and the memory 510 may be connected by a bus or in other ways.

The memory 510, as a non-transitory computer-readable storage medium, may be used to store a non-transitory software program and a non-transitory computer-executable program. In addition, the memory 510 may include a high speed random access memory, and may also include a non-transitory memory, e.g., at least a magnetic disk storage device, a flash memory device, or other non-transitory solid-state storage devices. In some implementations, the memory may include memories located remotely from the processor 520, which may be connected to the processor 520 via a network. Examples of the network include, but not limited to, the Internet, an intranet, a local area network, a mobile communication network, and combinations thereof.

The non-transitory software program and instructions required to implement the transmission method of the foregoing embodiments are stored in the memory 510 which, when executed by the processor 520, cause the processor 520 to implement the transmission method of the foregoing embodiments, for example, implement the methods in any one of the embodiments shown in FIG. 1 to FIG. 5.

According to a scheme provided in the embodiments of the present disclosure, a home CP and a coordination CP corresponding to a UE are determined from a plurality of CPs included in a super cell. Data of a first PDCCH is transmitted to the UE jointly through the home CP and the coordination CP and data of different layers of a first PDSCH is transmitted to the UE through the home CP and the coordination CP when a resource scheduling policy of the super cell is a centralized scheduling policy, where the first PDSCH is scheduled by the first PDCCH. In this way, when the super cell uses the centralized scheduling policy, a single-PDCCH transmission policy is used to realize multi-TRP coordinative transmission through the home CP and the coordination CP corresponding to the UE, thereby increasing the throughput of the UE. Data of a second PDCCH and data of a third PDCCH are transmitted to the UE respectively through the home CP and the coordination CP and data of a second PDSCH and data of a third PDSCH are transmitted to the UE respectively through the home CP and the coordination CP when the resource scheduling policy of the super cell is a distributed scheduling policy, where the second PDSCH is scheduled by the second PDCCH, and the third PDSCH is scheduled by the third PDCCH. In this way, when the super cell uses the distributed scheduling policy, a multi-PDCCH transmission policy is used to realize multi-TRP coordinative transmission through the home CP and the coordination CP corresponding to the UE, thereby increasing the throughput of the UE.

The apparatus embodiments described above are merely examples. The units described as separate components may or may not be physically separated, i.e., may be located in one place or may be distributed over a plurality of network units. Some or all of the modules may be selected according to actual needs to achieve the objects of the scheme of this embodiment.

In addition, an embodiment of the present disclosure further provides a computer-readable storage medium, storing a computer program executable by a processor or a controller which, when executed by the processor or the controller, causes the processor or the controller to implement the transmission method of the foregoing embodiments, for example, implement the methods in any one of the embodiments shown in FIG. 1 to FIG. 5.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and can be accessed by a computer. In addition, as is known to those having ordinary skills in the art, the communication medium typically includes computer-readable instructions, data structures, program modules, or other data in a modulated data signal such as a carrier or other transmission mechanism, and can include any information delivery medium.

Although some implementations of the present disclosure have been described above, the present disclosure is not limited thereto. Those having ordinary skills in the art can make various equivalent modifications or replacements without departing from the scope of the present disclosure. Such equivalent modifications or replacements fall within the scope defined by the claims of the present disclosure.

What is claimed is:

1. A transmission method, applied to a network device, the method comprising:
   determining a home Cell Portion (CP) and a coordination CP corresponding to a User Equipment (UE) from a plurality of CPs comprised in a super cell, comprising:
      acquiring a signal strength received by each CP in the super cell from the UE;
      determining a largest signal strength value and a second largest signal strength value from the signal strengths received by the CPs from the UE; and
      determining a CP corresponding to the largest signal strength value as the home CP and a CP corresponding to the second largest signal strength value as the coordination CP, in response to a difference between the largest signal strength value and the second largest signal strength value being not greater than a preset threshold; and
   transmitting data of a first Physical Downlink Control Channel (PDCCH) to the UE jointly through the home CP and the coordination CP and transmitting data of different layers of a first Physical Downlink Shared Channel (PDSCH) to the UE through the home CP and the coordination CP, in response to a resource scheduling policy of the super cell being a centralized scheduling policy, wherein the first PDSCH is scheduled by the first PDCCH.

2. An electronic device, comprising: a memory, a processor, and a computer program stored in the memory and executable by the processor which, when executed by the processor, causes the processor to perform the transmission method of claim 1.

3. A non-transitory computer-readable storage medium, storing a computer program which, when executed by a processor, causes the processor to perform the transmission method of claim 1.

4. A transmission method, applied to a User Equipment (UE), the method comprising:
   receiving data of a first Physical Downlink Control Channel (PDCCH) transmitted jointly through a home Cell Portion (CP) and a coordination CP and receiving data of different layers of a first Physical Downlink Shared Channel (PDSCH) transmitted through the home CP and the coordination CP, in response to a resource scheduling policy of a super cell being a centralized scheduling policy, wherein the first PDSCH is scheduled by the first PDCCH; or
   receiving data of a second PDCCH and data of a second PDSCH which are transmitted through the home CP and receiving data of a third PDCCH and data of a third PDSCH which are transmitted through the coordination CP, in response to the resource scheduling policy of the super cell being a distributed scheduling policy, wherein the second PDSCH is scheduled by the second PDCCH, and the third PDSCH is scheduled by the third PDCCH;
   wherein the home CP is a CP receiving a largest signal strength from the UE among a plurality of CPs comprised in the super cell; the coordination CP is a CP receiving a second largest signal strength from the UE among the plurality of CPs comprised in the super cell; and a difference between the signal strengths received by the home CP and the coordination CP from the UE is not greater than a preset threshold.

5. The method of claim 4, wherein in response to the resource scheduling policy of the super cell being the distributed scheduling policy, the method further comprises:

respectively transmitting a first Hybrid Automatic Repeat Request (HARQ) feedback and a second HARQ feedback to a network device, wherein the first HARQ feedback is a feedback for the second PDSCH, and the second HARQ feedback is a feedback for the third PDSCH; or transmitting a third HARQ feedback to the network device, wherein the third HARQ feedback is a joint feedback for the second PDSCH and the third PDSCH.

6. An electronic device, comprising:

a memory, a processor, and a computer program stored in the memory and executable by the processor which, when executed by the processor, causes the processor to perform the transmission method of claim 4.

7. A non-transitory computer-readable storage medium, storing a computer program which, when executed by a processor, causes the processor to perform the transmission method of claim 4.

8. A transmission method, applied to a network device, the method comprising:

determining a home Cell Portion (CP) and a coordination CP corresponding to a User Equipment (UE) from a plurality of CPs comprised in a super cell, comprising:

acquiring a signal strength received by each CP in the super cell from the UE;

determining a largest signal strength value and a second largest signal strength value from the signal strengths received by the CPs from the UE; and determining a CP corresponding to the largest signal strength value as the home CP and a CP corresponding to the second largest signal strength value as the coordination CP, in response to a difference between the largest signal strength value and the second largest signal strength value being not greater than a preset threshold; and transmitting data of a second PDCCH through the home CP and data of a third PDCCH through the coordination CP to the UE and transmitting data of a second PDSCH through the home CP and data of a third PDSCH through the coordination CP to the UE, in response to the resource scheduling policy of the super cell being a distributed scheduling policy, wherein the second PDSCH is scheduled by the second PDCCH, and the third PDSCH is scheduled by the third PDCCH.

9. The method of claim 8, wherein after transmitting data of a second PDSCH through the home CP and data of a third PDSCH through the coordination CP to the UE in response to the resource scheduling policy of the super cell being a distributed scheduling policy, the method further comprises:

receiving a first Hybrid Automatic Repeat Request (HARQ) feedback and a second HARQ feedback transmitted by the UE, wherein the first HARQ feedback is a feedback for the second PDSCH, and the second HARQ feedback is a feedback for the third PDSCH; or receiving a third HARQ feedback transmitted by the UE, wherein the third HARQ feedback is a joint feedback for the second PDSCH and the third PDSCH.

10. An electronic device, comprising:

a memory, a processor, and a computer program stored in the memory and executable by the processor which, when executed by the processor, causes the processor to perform the transmission method of claim 8.

11. A non-transitory computer-readable storage medium, storing a computer program which, when executed by a processor, causes the processor to perform the transmission method of claim 8.

\* \* \* \* \*